(12) United States Patent
Payne et al.

(10) Patent No.: US 10,589,628 B2
(45) Date of Patent: Mar. 17, 2020

(54) SYSTEM AND METHOD FOR HOSTING APPLICATIONS IN A GRAPHICAL INSTRUMENT

(71) Applicant: Medallion Instrumentation Systems, LLC, Spring Lake, MI (US)

(72) Inventors: Martin Payne, Spring Lake, MI (US); Michael J. Sims, Zeeland, MI (US)

(73) Assignee: Medallion Instrumentation Systems, LLC, Spring Lake, MI (US)

( * ) Notice: Subject to any disclaimer, the term of this patent is extended or adjusted under 35 U.S.C. 154(b) by 109 days.

(21) Appl. No.: 15/892,062

(22) Filed: Feb. 8, 2018

(65) Prior Publication Data

US 2018/0222321 A1 Aug. 9, 2018

Related U.S. Application Data

(60) Provisional application No. 62/456,895, filed on Feb. 9, 2017.

(51) Int. Cl.
| | |
|---|---|
| *B60K 37/06* | (2006.01) |
| *G06F 3/0488* | (2013.01) |
| *H04W 4/60* | (2018.01) |
| *G06F 3/0481* | (2013.01) |
| *B60K 35/00* | (2006.01) |

(Continued)

(52) U.S. Cl.
CPC ............. *B60K 37/06* (2013.01); *B60K 35/00* (2013.01); *G06F 3/0481* (2013.01); *G06F 3/04883* (2013.01); *G06F 9/451* (2018.02); *H04W 4/60* (2018.02); *H04W 4/80* (2018.02); *B60K 2370/1438* (2019.05); *B60K 2370/152* (2019.05); *B60K 2370/155* (2019.05); *B60K 2370/27* (2019.05); *B60K 2370/347* (2019.05); *B60K 2370/52* (2019.05); *B60K 2370/563* (2019.05); *B60K 2370/569* (2019.05);

(Continued)

(58) Field of Classification Search
CPC .......... H04W 4/80; H04W 4/60; G06F 9/451; G06F 3/04883; G06F 9/45545; B60K 35/00; B60K 37/06; B60K 2370/569; B60K 2370/1438; B60K 2370/563; B60K 2370/52; B60K 2370/155; B60K 2370/152; B60K 2370/347; B60K 2370/27; B60K 2370/589
See application file for complete search history.

(56) References Cited

U.S. PATENT DOCUMENTS

| | | |
|---|---|---|
| 2013/0167159 A1 | 6/2013 | Ricci et al. |
| 2014/0309870 A1* | 10/2014 | Ricci ....................... H04W 4/21 701/36 |

(Continued)

*Primary Examiner* — Muhammad N Edun
(74) *Attorney, Agent, or Firm* — Warner Norcross + Judd LLP

(57) ABSTRACT

An interface panel or graphical gauge that can host applications from a mobile application platform and display content from the hosted applications on a display of the graphical gauge. The interface panel may include a native operating system supporting an interface application that generates interface graphical output fed by the native operating system to a graphics controller. The interface control system may be configured to support a guest system that generates guest graphical output fed to the graphics controller. The guest graphical output is representative of graphic information generated by the mobile application platform.

36 Claims, 6 Drawing Sheets

(51) Int. Cl.
*H04W 4/80* (2018.01)
*G06F 9/451* (2018.01)
*G06F 9/455* (2018.01)

(52) U.S. Cl.
CPC .... *B60K 2370/589* (2019.05); *G06F 9/45545* (2013.01); *G06F 2203/04804* (2013.01)

(56) References Cited

U.S. PATENT DOCUMENTS

2018/0024725 A1* 1/2018 Penilla .................. B60W 40/08
  701/49
2018/0301095 A1* 10/2018 Runyan ................ G09G 3/3406

* cited by examiner

SYSTEM AND METHOD FOR HOSTING APPLICATIONS IN A GRAPHICAL INSTRUMENT

TECHNICAL FIELD

The present application relates to a graphical instrument or graphical gauge, and more particularly to a graphical instrument that can host applications from a mobile application platform and display content from the hosted applications on a display of the graphical instrument.

BACKGROUND

Human machine interfaces (HMIs) in the form of graphical instruments or graphical gauges are found in many forms in many types of vehicles. One common type of HMI or graphical instrument includes a speedometer and is provided in a dashboard of a On-Road, Off-Road, or Marine vehicle. The graphical instrument may include more than one gauge, such as a speedometer and a tachometer, to convey gauge information to a vehicle operator. The graphical instrument may form all or a portion of a vehicle dash, such as the interface panel in front of the vehicle operator or a center console display.

In many conventional HMI implementations, the HMI construction is fully designed to meet the custom needs of an end customer. For instance, the HMI implementation may include several customized graphical gauges to provide vehicle status information, such as vehicle speed, engine speed, miles traveled, engine running hours, fuel level, engine status, HVAC status and control, generator status and control, and heated seat status and control. These customized graphical gauges are often supported by a native operating system configured to meet the custom needs of the end customer.

The requirements outlined by the end customer may include additional aspects not limited to vehicle status information, including, for instance, a navigation system, weather forecast, or a network-based audio system. Significant effort and expense is often dedicated to satisfy such customer requirements. For instance, developing a navigation system supported natively by the native operating system of the HMI may involve a significant number of man-hours to develop and debug, as well as licensing fees for maps and global positioning system (GPS) technology. In many cases, lower volumes associated with the conventional HMI construction place the HMI manufacturer in a weaker negotiation position with respect to licensing fees as opposed to higher volume navigations systems developed by manufacturers or developers (e.g., Garmin or Google Maps) that dedicate aspects of their business toward navigation systems. The higher volume navigations systems are most often available on mobile platforms being used by a significant number of users, including Android® and iOS® mobile platforms. These mobile platforms operate in a manner that prevents sharing of display resources or user feedback resources, or both, with other platforms, thereby substantially impeding co-operation with other systems, such as the native operating system of the HMI construction.

SUMMARY OF THE DESCRIPTION

The present disclosure is directed to an interface panel or graphical gauge that can host applications from a mobile application platform and display content from the hosted applications on a display of the graphical gauge. The hosted application may include a non-resident application.

In one embodiment, the interface panel may include a display configured to provide graphic information to a vehicle operator, and a graphics controller configured to direct the graphic information to the display based on graphical input representative of the graphic information. The interface panel may include an interface control system configured to provide the graphical input to the graphics controller to generate the graphic information on the display. The interface control system may include a native operating system supporting an instrument application that generates instrument graphical output fed by the native operating system to the graphics controller. The interface control system may be configured to support a guest system that generates guest graphical output fed to the graphics controller, where the guest graphical output is representative of guest graphic information. The guest system corresponds to a mobile device platform configured to a mobile device.

In one embodiment, the graphical information output from the instrument application may be mixed with the graphical information from the mobile device platform. As an example, the graphical information from two or more sources may be mixed in memory to yield a graphical output that is a composite of the graphical information from the two or more sources. As another example, graphical information output from the instrument application is directed to a foreground layer of a display, and graphical information from the mobile device platform is provided to a background layer. A transparency layer is incorporated into the foreground layer to facilitate viewing the background layer. This transparency layer can be implemented as a form of Alpha, Colorkey, or other methods to allow a mix of individual graphics created in memory regions, which may be allocated in hierarchal layers or independently mapped zones. The background layer may have a size that is different from the foreground layer and that corresponds to a display size expected by the mobile device platform.

The display may include a touchscreen in one embodiment of the present disclosure that enables a vehicle operator to provide touch-based feedback to the control system. The interface control system may direct the touch-based feedback to the instrument application or the guest system, or both, based on the location of the touch. In this way, the vehicle operator may be allowed to control both the instrument application and the guest system from the same display interface.

In another embodiment, a method of displaying information on a vehicle instrument interface is provided. The method may include generating, in an interface application, interface graphical information for display to a vehicle operator, and running a mobile application platform separate from the interface application. The method may further include generating, from the mobile application platform, mobile application graphical information for display to the vehicle operator.

The method according to one embodiment may include providing the interface graphical information to a foreground layer of an interface display, generating a transparency area in the foreground layer such that a background layer of the interface display is visible through the foreground layer, and providing the mobile application graphical information to the background layer of the interface display.

In yet another embodiment, a user interface for a vehicle includes a display configured to provide graphic information to a vehicle operator, and a touch screen interface configured to generate touch-based feedback corresponding to a location of the display that is touched by a user. The user interface may include a graphics controller configured to direct the graphic information to the display based on graphical input representative of the graphic information, and one or more processors configured to support directing graphic information to the graphics controller from an instrument interface system and a guest system. The instrument interface system and the guest system may execute concurrently on the one or more processors. Graphic information generated from the instrument interface system may be provided to an interface area of the display, and graphic information generated from the guest system is provided to a guest system area of the display. Touch-based feedback corresponding to the guest system area is directed to the guest system, and touch-based feedback corresponding to the instrument interface area is directed to the instrument interface system. In one embodiment touch-based feedback may be provided to both the guest system and the instrument interface system, and the respective system may determine whether to perform an action based on the touch-based feedback.

In still another embodiment, a method is provided that creates an ability to execute and display applications familiar to a customer or vehicle operator from within a customized instrumentation display. The method may also allow this content to be integrated within an instrumentation HMI.

In still yet another embodiment, a method includes implementing, in the instrument both a native HMI running on one native OS as well as a secondary OS running and configured to host and display generic/non-resident applications. This may either be displayed on the whole of the display, on a second display, or as a window within the display. It is not necessary for a method according to the present disclosure to require that the secondary OS or guest system that runs generic/non-resident applications to be different from the native OS, nor is it required that such applications be generic or non-resident. Applications that are configured for the secondary OS or guest system and that are familiar to mobile platform users do not need to be re-invented or retooled. User familiarity with such applications can be maintained, and time to develop and bring to market a system with such applications can be reduced.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
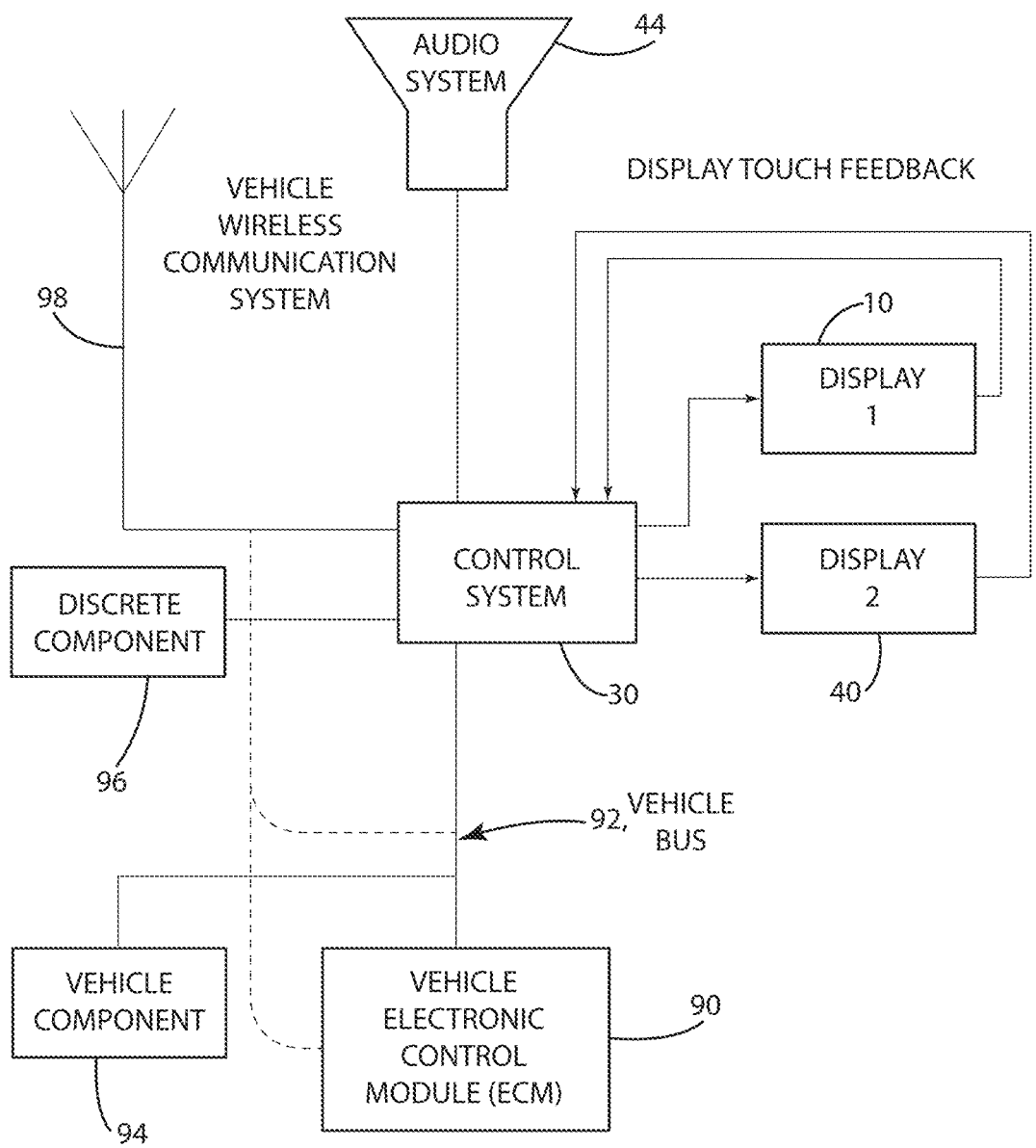
FIG. 1 is a representative view of a control system included in a vehicle system according to one embodiment.
Figure 2:
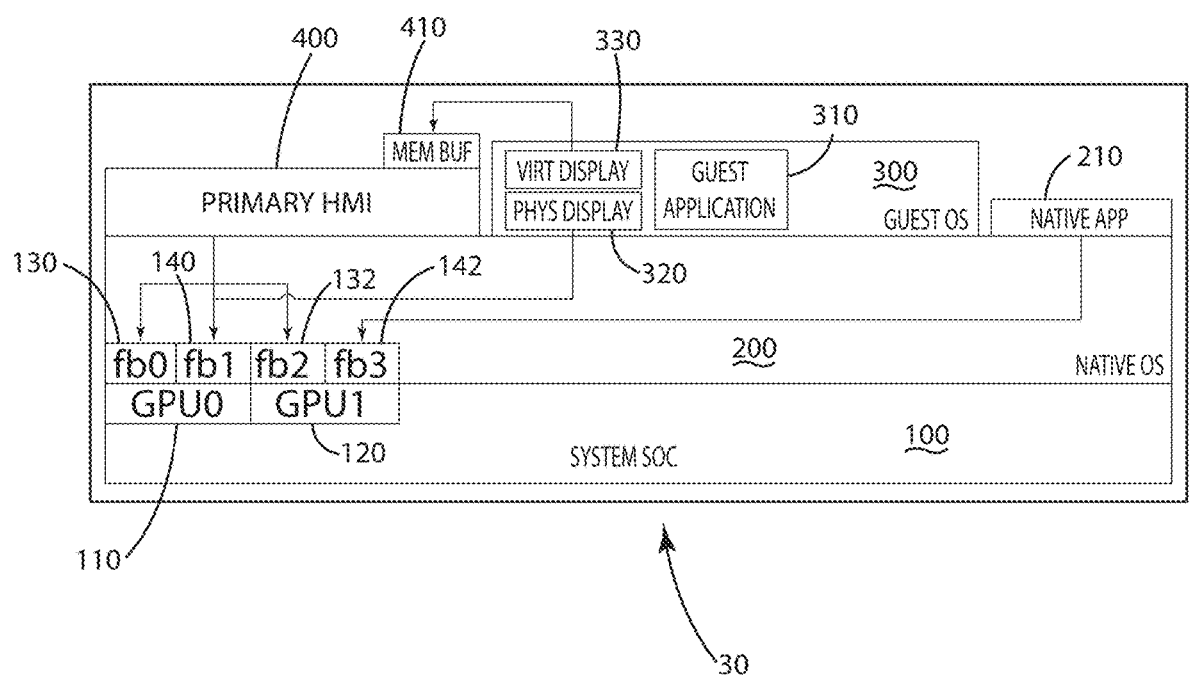
FIG. 2 is a representative view of the control system of FIG. 1.
Figure 3:
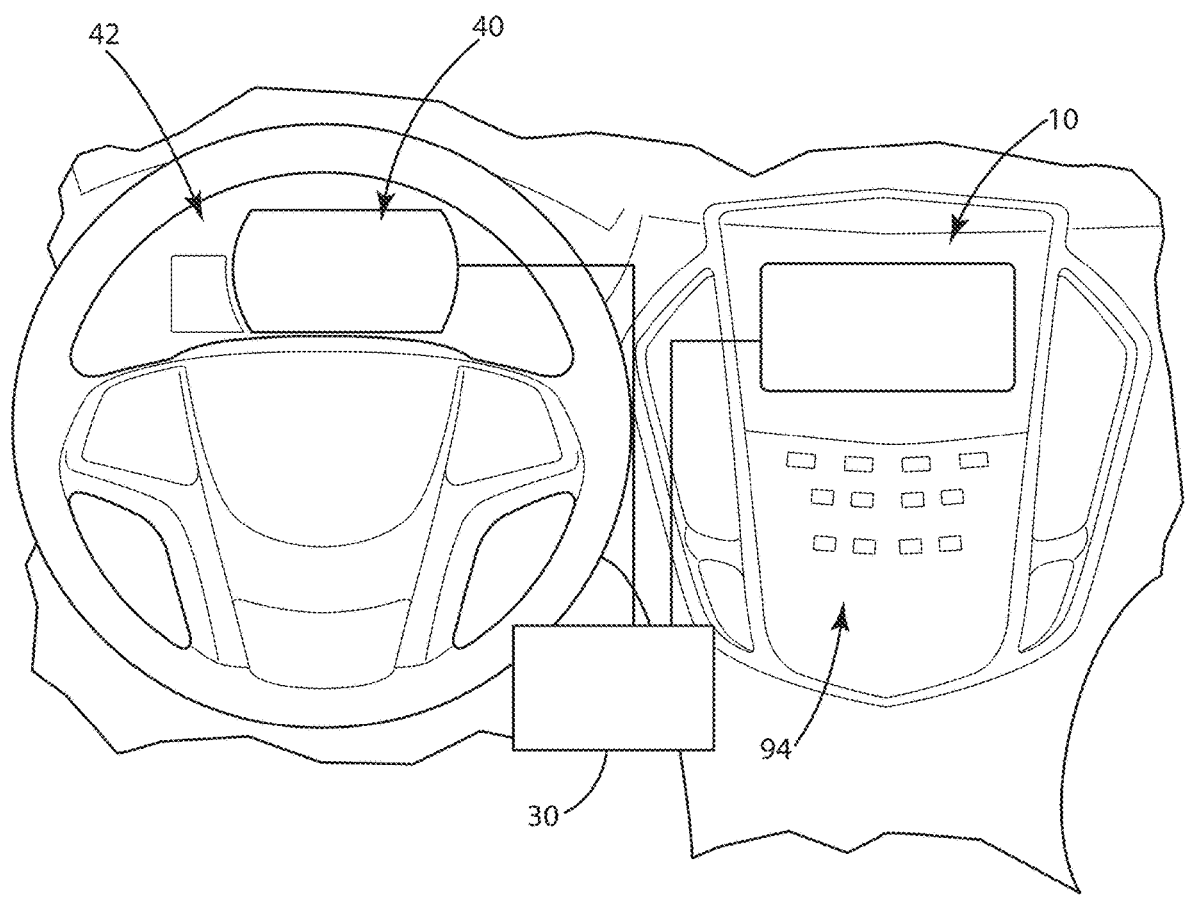
FIG. 3 is a vehicle dashboard and center console according to one embodiment.

A control system according to one embodiment of the present disclosure is shown in the illustrated embodiments of FIGS. 1-3, and generally designated 30. The control system 30 may be incorporated into a vehicle to facilitate display of graphic information to a vehicle operator. In this way, the control system 30 may form an interface control system or a gauge control system. The graphic information may pertain to a status of the vehicle, but as discussed herein, the graphic information is not so limited and may include information generated from a guest system. The vehicle may be any type of vehicle adapted for transportation, including, for example, aircraft, buses, commercial vehicles, motorcycles, snowmobiles, sport utility vehicles (SUVs), trucks, utility task vehicles, and watercraft including personal watercraft. It should be noted that the present disclosure is not limited to the realm of vehicles—the control system 30 and the display may be utilized in conjunction with any instrumentation system. Examples of other instrumentation systems include HVAC instrumentation, machine control instrumentation, and plant control instrumentation.

I. Overview of the Vehicle System

The control system 30 may be configured to communicate with a one or more vehicle components of the vehicle, including, for example, one or more of the following: an audio system 44, a discrete I/O controlled component 96, a vehicle control module (ECM) 90, a vehicle component 94, and a wireless communication system 98. In the illustrated embodiment, one or more of the vehicle components may communicate with each other via a vehicle bus 92, which may include a CAN bus or a LIN bus, or a combination thereof. It should be understood that communication via the vehicle bus 92 is not limited to communication between the one or more vehicle components. The control system 30 or other components operating in conjunction with the control system 30 may communicate via the vehicle bus 92. In addition or alternative to the vehicle bus 92, the control system 30 or other components operating in conjunction with the control system 30 may communicate directly via discrete I/O or a dedicated bus, or a combination thereof. For instance, as depicted in the illustrated embodiment in solid and broken lines, the wireless communication system 98 may communicate with the control system 30 via one or more of a dedicated communication link, the vehicle bus 92, or indirectly through another component such as the Engine Control Module (ECM) 90.

The wireless communication system 98 in the illustrated embodiment may be configured to communicate wirelessly according to one or more standard communication protocols, including, for instance, 3G or 4G mobile telecommunications, Bluetooth including Bluetooth Low Energy (BTLE), IEEE 802.11 and GPS. In this way, the wireless communication system 98 may provide a communications link to the control system 30 with respect to graphic information being presented to a vehicle operator. To provide a few examples, GPS capabilities may enable the control system 30 to obtain GPS coordinates of the vehicle. Bluetooth communication capabilities may enable communication with a portable device, such as a mobile phone, external to the control system 30. Such communications may include providing or exchanging audio information, such as music or voice, with the control system 30. 3G or 4G mobile telecommunications may enable use of cellular data by a guest system, as discussed herein, to download information from an application store associated with the guest system.

In communicating directly or indirectly with the one or more components, the control system 30 may obtain information relating to the graphic information presented to the vehicle operator in accordance with requirements set forth by the vehicle manufacturer. For example, if the graphic information includes speed information in the form of a speedometer, the control system 30 may obtain the speed information from the ECM 90 or by monitoring the vehicle bus 92 for messages related to the speed of the vehicle. As another example, the control system 30 may communicate with the wireless communication system 98 to obtain GPS coordinates relating to a location of the vehicle.

The one or more components of the vehicle that are in communication with the control system 30 may include a variety of inputs. Example components that may be coupled to the control system 30 include an accelerometer, a gyroscope, a magnetic compass, a temperature sensor, a water depth sensor, fluid level with respect to a ballast tank, and pump or bilge status. Inputs from these or other components or sensors described herein or any type of vehicle-based sensor may be provided to the control system 30, which may generate graphical information to present data pertaining to the inputs to the vehicle operator. The one or more components may provide real-time sensor input to the control system 30, which may in turn provide real-time information that is based on the real-time sensor input. The real-time information may be provided to the interface application 400 for display as graphical information. For instance, the control system 30 may receive input indicative of a water depth sensed by the water depth sensor. The interface application 400 may display a graphical object that identifies the sensed water depth.

II. Control System and Display

In the illustrated embodiment of FIGS. 1-4, the control system 30 is coupled to a display 10 configured to present graphical information to the vehicle operator. The display 10 in the illustrated embodiment may be disposed in a vehicle dash in front of the vehicle operator. Alternatively, the display 10 may be disposed in a center console of the vehicle as depicted in the illustrated embodiment of FIG. 3. It should be understood that the display 10 may be disposed at any location with respect to the vehicle.

The display 10 in the illustrated embodiment may form all or part of an interface panel 42 of the vehicle. For instance, the interface panel 42 of the vehicle may be formed of a plurality of separate displays that together provide a human machine interface for the vehicle operator. Alternatively, the interface panel 42 may be defined by a single display capable of presenting multiple types of graphic information to the user, including graphic information pertaining to status of the vehicle, such as both speed and fuel level. The graphic information provided on the display may include information generated by a guest system as discussed herein, including, for instance a user interface of a mobile application platform, such as an Android® mobile application platform.

The display 10 in the illustrated embodiment may be a touchscreen capable of providing touch-based feedback to the control system 30 relating to a location of the display touched by a user. In the illustrated embodiments of FIGS. 4-5, graphic information is presented on a display and includes one or more icons 16, 18 respectively associated with one or more actions or functions available to the user. If the user touches the display at a location associated with icon 16, the touchscreen may provide feedback to the control system 30 relating to the location of touch input. In turn, the control system 30 may determine the touch input corresponds to the icon 16, the control system 30 may execute an action or function associated with the icon 16.

In the illustrated embodiments of FIGS. 1-3, the control system 30 is configured to present graphical information on a second display 40. The second display 40 is optional, and may be disposed and configured on the vehicle in a manner similar to the display 10. As an example, the second display 40 may be provided in an interface panel 42 in front of the vehicle operator or in a center console of the vehicle. The second display 40, like the display 10, may or may not be a touchscreen capable of providing touch-based feedback to the control system 30. It should be understood that the present disclosure is not limited to one or two displays, and that more than two displays may be provided in conjunction with the control system 30.

Turning to FIG. 2, the control system 30 and components thereof are shown in greater detail according to one embodiment of the present disclosure. The control system 30 in the illustrated embodiment of FIG. 2 is depicted in terms of modules associated with control aspects and operational layers of the control system 30. Although described in connection with several modules, it should be understood that the control system 30 may include a subset of the modules shown or additional modules to further expand capabilities of the control system 30, or a combination thereof. Further, the modules may be rearranged depending on the configuration of the control system 30.

In the illustrated embodiment of FIG. 2, the control system 30 includes a system platform 100 or system on chip (SOC) with one or more processors, such as single-, dual-, or quad-core ARM® processor produced by NXP under the model i.MX6. The system platform 100 may include memory, I/O, and a communication interface to facilitate communication with the one or more vehicle components. The system platform 100 may further include one or more graphics controllers 110, 120 configured to generate graphic information respectively for display on a display 10, 40. The one or more graphics controllers 110, 120 may be configured to compile graphics in a 'Z' order in which graphics provided to a foreground graphics buffer 130, 132 are displayed above or on top of all other graphics. The graphics controllers 110, 120 may generate a digital video output in a format compatible with a display 10, 40. As an example, the digital video output from the graphics controllers 110, 120 may be CEA-861 compatible, which is a digital form often incorporated in conventional HDMI or DVI interfaces. Alternatively, or additionally, at least one graphics controller 110, 120 may generate digital video output according to another format, which may or may not be a standardized format. In the illustrated embodiment of FIG. 2, the graphic controller 110 includes a foreground graphics buffer 130 (also designated fb0) and a background graphics buffer 140 (also designated fb1), which may be routed to the display 10. The graphics controller 120 includes a foreground graphics buffer 132 (also designated fb2) and a background graphics buffer 142 (also designated fb3), which may be routed to the display 40. It should be understood that the system platform 100 or the graphics controllers 110, 120 may be configured differently.

In one embodiment, the one or more graphics controllers 110, 120 are described in connection with mixing graphical information form more than one source via layers and transparency areas generated in a hierarchal manner. It should be understood that the present disclosure is not so limited. The mixing of graphical information may be achieved in a variety of ways, including, for instance, compiling a rendered image of graphical information from multiple sources via non-hierarchal manner. An example of a non-hierarchal rendering includes memory regions of one or more graphics controllers 110, 120 being created independently and combined without hierarchy to create a rendered image. Sprites or drawings may be stored independently in one or more memory regions. A hardware sprite engine may combine sprites line by line onto a single raster without a foreground layer, background layer, or one or more other hierarchal graphics layers that are composited, or a combination thereof. Non-hierarchal rendering is also provided as a capability in hardware available from Freescale as a Display Control Unit (DCU) (e.g., Spectrum and Rainbow processors) and continued in other lines of Freescale processors, such as the 2D ACE (Animation and Compositing Engine) implemented in the Vybrid processor.

The system platform 100 may be configured to support a native operating system 200 that manages application usage of hardware of the system platform 100, and that manages software resources available to one or more applications. For instance, the native operating system 200 may be a modular operating system with a base kernel, similar to Linux or another Unix variant. It should be understood that the native operating system 200 may be any type of operating platform, including any operating platform that supports multi-tasking of processes on the one or more processors of the system platform 100.

The native operating system 200 as discussed herein may support native execution of a process or thread, including an HMI process, instrument application, or interface application 400. In one example, the interface application 400 may be configured to communicate with one or more vehicle components to obtain status information pertaining to the vehicle and to generate graphical output representative of the status information. This information may be processed and presented directly onto the display layers created by FB0-3 (130, 140, 132, 142). A guest system 300, such as a guest operating system, and one or more a native application may also be hosted by the native operating system 200, where at least one of the guest system 300 and the one or more native applications may also create graphics that are presented directly to the display layers exposed by the native operating system 200.

The native operating system 200 may also support native execution of one or more guest systems 300, such as a hypervisor or a Java® virtual machine or other run-time environment or engine in which an application can run from within the environment or be used as instructions for the environment, or a combination thereof. Additionally, or alternatively, the one or more guest systems 300 may bypass the native operating system 200 and run directly on the system platform 100. In bypassing the native operating system 200, the guest system 300 may run directly on the 'bare-metal' of the system platform 100. A guest system 300 may be considered a guest operating system or a virtual machine, and may provide a virtual operating platform that manages execution of a guest application 310. As an example the guest system 300 may include all or a subset of aspects of the Android mobile operating platform, including a run time environment that supports execution of mobile applications as guest applications. As another example, the one or more guest systems 300 may bypass the native operating system 200 and run directly on the system platform 100 alongside the native operating system 200 on the system platform 100. The native operating system 200 and the one or more guest systems 300 may run alongside each other in a variety of ways, including on different processor cores or within a hypervisor type system.

In one embodiment, applications (e.g., the interface application 400 and the guest system 300) executing natively on the native operating system 200 may be assigned to separate control groups to allocate resources among the applications. Resources such as processor clock time and memory may be apportioned to substantially avoid leakage between applications or one application corrupting another application. As an example, the interface application 400 may be configured to comply with Federal Motor Vehicle Safety Standards (FMVSS). To facilitate maintaining such compliance, the interface application 400 may be allocated memory that remains substantially separate from other applications executing on the native operating system 200.

Although the HMI process or interface application 400 is described herein as executing natively on the native operating system 200, it should be understood that the present disclosure is not so limited and that the interface application 400 may execute within a virtual machine. It should also be understood that the system platform 100 may be configured to execute a native application 210 in addition to the interface application 400.

The guest system 300 may be configured to generate a guest graphical output representative of graphic information to be presented on a display, such as one or both of the displays 10, 40. The guest graphical output may be generated from a guest physical display output 320 or a guest virtual display output 330, or both. The guest physical display output 320 may be provided directly to the graphics controller 110, 120 of the system platform 100 for presentation on the foreground of a first or second display, on a background layer within a transparency of the foreground of the display, or in a virtual space where it can be cast or displayed within the graphic information of the interface application 400, or any combination thereof. In one embodiment, graphic information generated from the interface application 400 may be provided to the display 10, and graphic information generated from a guest system 300 or a native application, or both, maybe provided to the second display 40.

In the illustrated embodiment, the guest system 300 is a mobile application platform, such as the Android® mobile application platform, designed around an ecosystem of available applications, including navigation applications and audio applications. Such a mobile application platform is configured to be the only system operating on a portable device (e.g., a smartphone) and to control the entire display area of the portable device. Mapping graphical output from such a mobile application platform to an entirety of one of the displays 10, 40 yields little room for coexistence with graphical output from other applications running on the system platform 100.

The guest system 300 in the illustrated embodiment may be configured to generate graphical output from the guest physical display output 320 that is directed to a background graphics buffer 140, 142 of the graphics controller 110, 120 associated with a graphics layer other than the foreground layer. In this way, the graphical output generated from the mobile application platform may be confined to a background layer dedicated to the mobile application platform to provide the mobile application platform with the understanding that it has control over the entire display area. In many cases, the display 10, 40 may be dimensionally larger or different from a portable device display for which the mobile application platform is configured. The background graphics buffer 140, 142 may be configured differently than the foreground buffers 130, 132 to mimic dimensionality similar to or the same as that expected by the mobile application platform. For instance, the size or aspect ratio, or both, of the background graphics buffer may be determined so that the background layer is similar to the size and aspect ratio of a portable device display for which the mobile application platform is configured. In a more specific example, the size of the background layer may include 1080 lines of vertical resolution and 1920 columns of horizontal resolution with a 16:9 aspect ratio. This size can be described as 1920×1080 pixels or in short as "1080". Other example sizes include 1280×480 pixels, 1280×720 pixels. It should also be understood that a location of the background layer may be changed to align with an area of the foreground of the display 10, 40.

Figure 4:
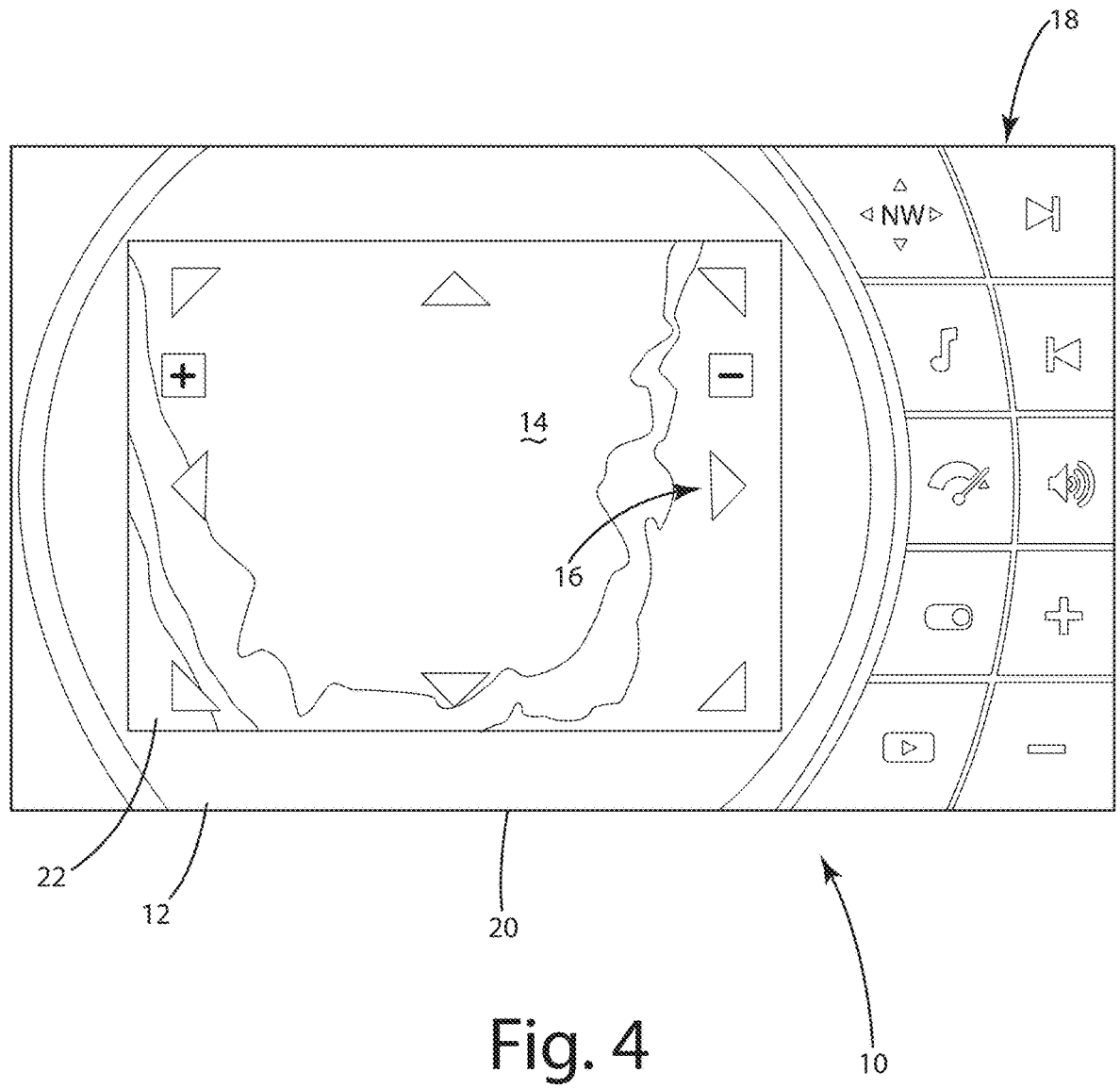
FIG. 4 is representative view of a display according to one embodiment.
Figure 5:
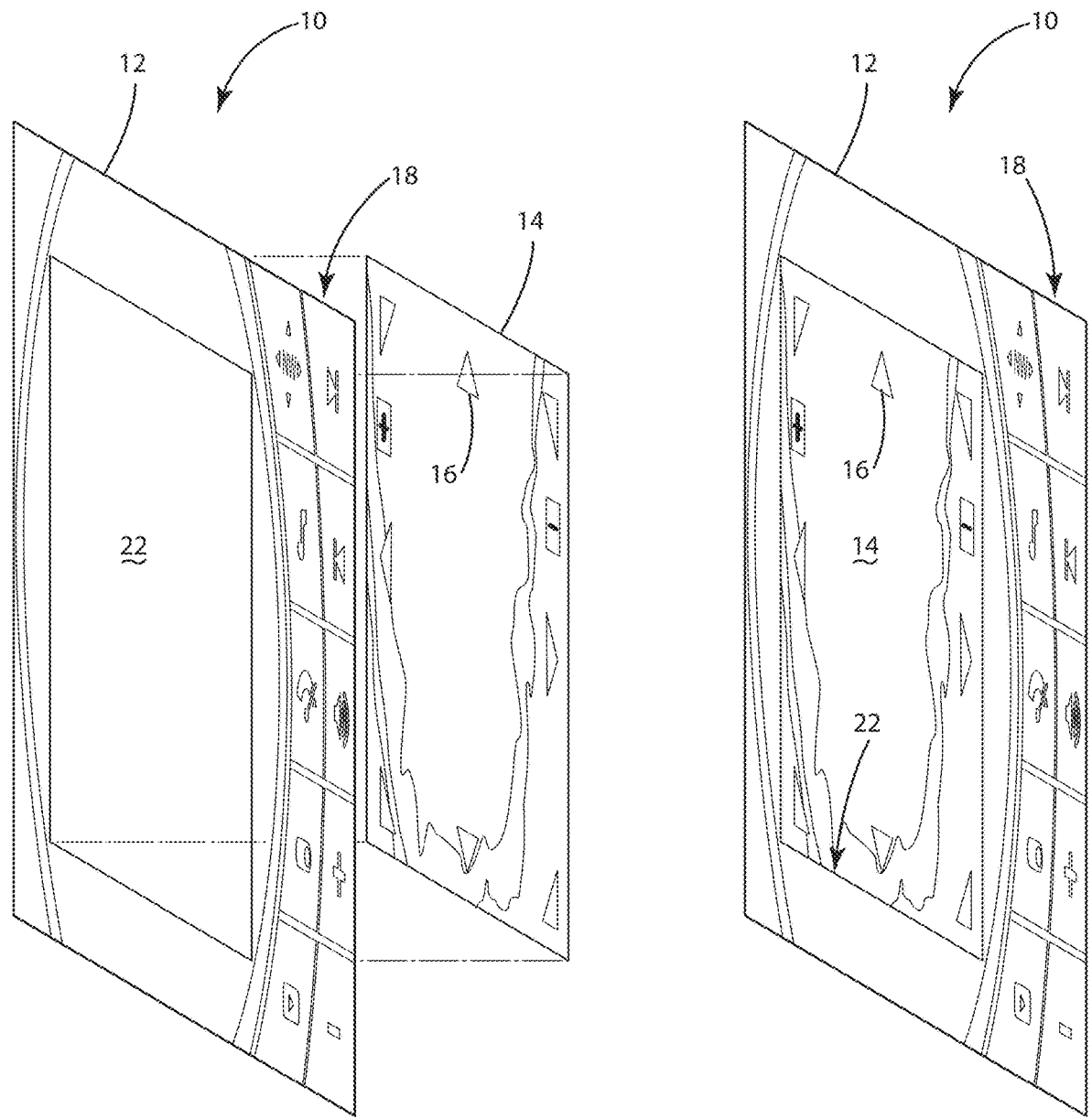
FIG. 5 is a representative view of the display according to one embodiment.

In the illustrated embodiments of FIGS. 4-5, the layering of graphical outputs from the interface application 400 and the guest system 300 are shown on the display 10, and generally designated 12 and 14, respectively. Graphical output from the interface application 400 may be directed to the foreground graphics buffer 130, which is ultimately provided in the form of graphic information displayed on foreground layer 12. Graphical output from the guest system 300 may be directed to the background graphics buffer 140, which is ultimately provided in the form of graphic information displayed on background layer 14. An area of the foreground layer 12 may be made transparent in an area of the background layer 14 that is identified for presentation to a vehicle operator. The transparent area is designated 22 in the illustrated embodiment of FIG. 4. Transparency may be achieved by alpha blending or adjusting an alpha channel associated with the transparency area 22 of the foreground layer 12.

With the transparency area 22 of the foreground layer 12, the display 10 may present a graphical display that merges graphical output from a natively executing interface application 400 and a guest application 310. In one embodiment, the guest application 310 may be an application configured to execute on a mobile application platform, such as the Android® mobile platform or the iOS mobile platform. Graphical output from the mobile application platform may be directed to the background layer 14, while a transparency region is generated in the foreground layer 12 to make visible the presented area of the background layer 14.

In the illustrated embodiments, the display 10 is a touchscreen interface, and both the interface application 400 and the guest application 310 are displaying graphical objects, such as icons 16, 18 associated with one or more respective actions or functions. For instance, in the illustrated embodiment, the guest application 310 is a navigation application running on an Android® mobile platform, and the icon 16 displayed by the navigation application is an arrow icon associated with a panning function to pan the map currently displayed. Touch-based feedback with respect to a user touch on the icon 16 may be routed to the interface application 400 and/or the guest system 300, and if appropriate translated to a coordinate system of the guest system 300 that is associated with the size and location of a display area of the guest system 300 in the background layer 14. Alternatively, the touch-based feedback may be routed to the interface application 400, which may in turn route the feedback to the guest system 300.

In one embodiment, the touch-based feedback may be routed to both the interface application 400 and the guest system 300. As discussed herein, the guest system 300 may be configured to operate with the understanding that the guest system 300 has control over an entire display area. This display area may be provided to a background layer 14 and can be scaled and offset relative to a foreground layer 12, enabling the display area of the guest system 300 to be selectively located relative to the foreground layer. The transparency area 22, as described herein, of the foreground layer 12 may be aligned with all or part of the display area of the guest system 300, and enable selective visibility with respect to all or part of the display area of the guest system 300. In this way, in one embodiment, the guest system 300 may operate with the understanding that the guest system 300 has control over its entire display, while at the same time the native operating system 200 may control the size and location of the display area of the guest system 300. The size and location of the display area of the guest system 300 in the background layer 14 may vary during operation or remain static during operation. Additionally, or alternatively, the size and location of the transparency area 22 may vary during operation or remain static during operation.

In one embodiment, the guest system 300 may operate with an understanding of control over the entire display 10, but actually the guest system 300 may not have such control and is offset and scaled relative to the display 10. As a result, the coordinate system understood by the guest system 300 may be different from the coordinate system utilized by the display 10. The guest system 300 may include a coordinate translator configured to receive touch-based feedback in a first coordinate system associated with the display 10, and to translate this touch-based feedback to a second coordinate system used by the guest system 300.

The coordinate translator in the illustrated embodiment may receive touch-based feedback indicative of an X, Y coordinate associated with the display 10, and translate this X, Y coordinate to an X', Y' coordinate associated with a display area used by the guest system 300. Example functions used by the coordinate translator include: X'=ScaleX*X+OffsetX, Y'=ScaleY+OffsetY. OffsetX and OffsetY may be indicative of the location of the display area used by the guest system 300 with respect to the display 10. ScaleX and ScaleY may be the same or different depending on the application. As an example, ScaleX and ScaleY may be the same if the display area of the guest system 300 is zoomed or expanded by 200% (or a scale of 2), thereby maintaining the aspect ratio. However, in one embodiment, it is not necessary to maintain the aspect ratio of the guest system 200—ScaleX and ScaleY may be different from each other so that the aspect ratio is different from the ratio used by the guest system 300.

In one embodiment, the guest system 300 may translate the coordinates of the touch-based feedback to X', Y' coordinates, and if the X', Y' coordinates are outside the bounds of a display area understood by the guest system 300, the X', Y' coordinates may be discarded or ignored.

In an alternative embodiment, touch-based feedback corresponding to an area of the foreground layer 12 outside the transparency area 22 may be routed to the application primarily associated with the foreground layer 12, in this case the interface application 400. For instance, if a user touches an area of the display 10 associated with the icon 18, the display 10 may provide feedback to the system platform 100 that is routed to the interface application 400.

With touch-based feedback, in one embodiment in which the display 10 is in the center console, the vehicle operator may control aspects of the system platform 100 that are presented on the display 10 and affect audio playback for the audio system 44, and at the same time, control aspects of a navigation application executing within the guest system 300 and being presented on the display 10.

With the touch-based feedback being routed to applications (optionally based on the location of the touch on the display 10), the system platform 100 may enable multiple applications to display graphical information concurrently on the display 10 as well as provide touch-based feedback capabilities for the same despite one or more of the applications being configured not to share display space.

In one embodiment, touch-based feedback may be generated in response to one or more touches to the display 10. The one or more touches may include a touch gesture, such as a one finger drag up or down or a two finger drag up or down. Examples of additional touch gestures include pinching or spreading two fingers, a two finger tap, a single finger hold and release, and a flick.

The touch-based feedback, as discussed herein in one embodiment, may be provided to both the interface application 400 and the guest system 300 (although the touch-based feedback may be provided to only one of the interface application 400 and the guest system 300 in an alternative embodiment). Each of the interface application 400 and the guest system 300 may separately conduct an action in response to the touch-based feedback.

Alternatively, the interface application 400 and the guest system 300 may coordinate an action in response to touch-based feedback, where the action may result in a change in display output by the interface application 400 or the guest system 300, or both. The coordinated action may or may not involve communication between the interface application 400 and the guest system 300. As an example, a touch to the display 10 outside the transparency area 22 and a touch inside the transparency area 22 may be processed by both the interface application 400 and the guest system 300 as a multi-touch, multi-system event, for which both touches are processed. The interface application 400 may identify such a multi-touch, multi-system event and conduct an associated action, or the guest system 300 may identify such a multi-touch, multi-system event and conduct an associated action, or both. In a more specific example, in the context of FIG. 6 this multi-touch, multi-system event may be associated with an action that displays graphical objects 420 in the form of multiple histograms of measured water depths and/or temperature by the interface application 400 within the transparency area 22. Each histogram may be disposed within the transparency area 22 at a corresponding point/time of measurement along the course traveled and depicted by the guest system 300. The locations of each histogram may be determined as a function of location and coordinate information communicated from the guest system 300 to the interface application 400. Alternatively, the interface application 400 may communicate the histogram information to the guest system 300 for display along the course traveled.

In one embodiment, the guest system 300 may communicate information to the interface application 400 to enable display of graphical information (and/or performance of an action) on the interface application 400 based on the communicated information and optionally, information obtained separately from the guest system 300. For instance, the guest system 300 may communicate course information relating to a path of a vehicle to the interface application 400, and the interface application 400 may generate graphical information based on this course information and heading information obtained from a compass coupled to the interface application 400.

Additional or alternative to the guest system 300 communicating information to the interface application 400, the interface application 400 may communicate information to the guest system 300 to enable display of graphical information (and/or performance of an action) from the guest system 300 based on the communicated information from the interface application 400 and optionally, information obtained separately from the interface application 400. As an example, the interface application 400 may communicate a history of water depth information measured at different times or taken at different locations, and the guest system 300 may overlay this measured water depth information over a course of the vehicle as shown on a map.

For purposes of disclose, one or more of the embodiments described herein focus on interaction between the interface application 400 and the guest system 300, such as communication of information from one to the other. It should be understood that the interaction with the guest system 300 is not limited to the interface application 400 and may include interaction with the native operating system 200 separate from the interface application 400.

Although a single transparency area 22 is shown in the illustrated embodiments of FIGS. 4-5, it should be understood that multiple transparency areas may be generated with respect to various areas of the foreground layer 12. A plurality of the background layers 14 may be provided in connection with the multiple transparency areas, each associated with a guest system 300 or a native application 210, or a combination thereof. And although various configurations and techniques are described in connection with displaying graphic information from the guest system 300, it should be understood that the guest system 300 may be replaced with a native application (e.g., 210) managed by the native operating system 200 in any of the embodiments herein.

Additionally or alternatively, in the case of graphical output from the guest virtual display output 330, the graphical output may be directed to a memory buffer 410 of a native application, such as the interface application 400 or another native application, for incorporation into a graphical output of the native application. The graphical output may represent a virtual area that is memory mapped to the memory buffer 410 associated with interface application 400. The graphical output may then be presented by the interface application 400 as a drawing object or other memory mapped image object along with other aspects of the graphical output from the interface application 400. In other words, the drawing object or image object provided from the guest virtual display output 330 may be manipulated by the interface application 400 and mixed with other graphical information output from the interface application 400. In this way, the guest virtual display output 330 may be fed back into an environment of the interface application 400, such as the primary HMI, where it can be displayed within the primary HMI.

In one embodiment, one or more characteristics of the transparency area 22 may be varied uniformly with respect to the entire transparency area 22. Alternatively, the one or more characteristics of the transparency area 22 may be varied with respect to a subset of pixels of the transparency area 22. For instance, the opacity (e.g., an alpha channel) of one or more pixels of the transparency area 22 may be varied while the opacity of one or more other pixels of the transparency area 22 remain the same. This way, one or more regions of the background layer 14 may be selectively obstructed by one or more regions of the transparency area 22 of the foreground layer 12.

Figure 6:
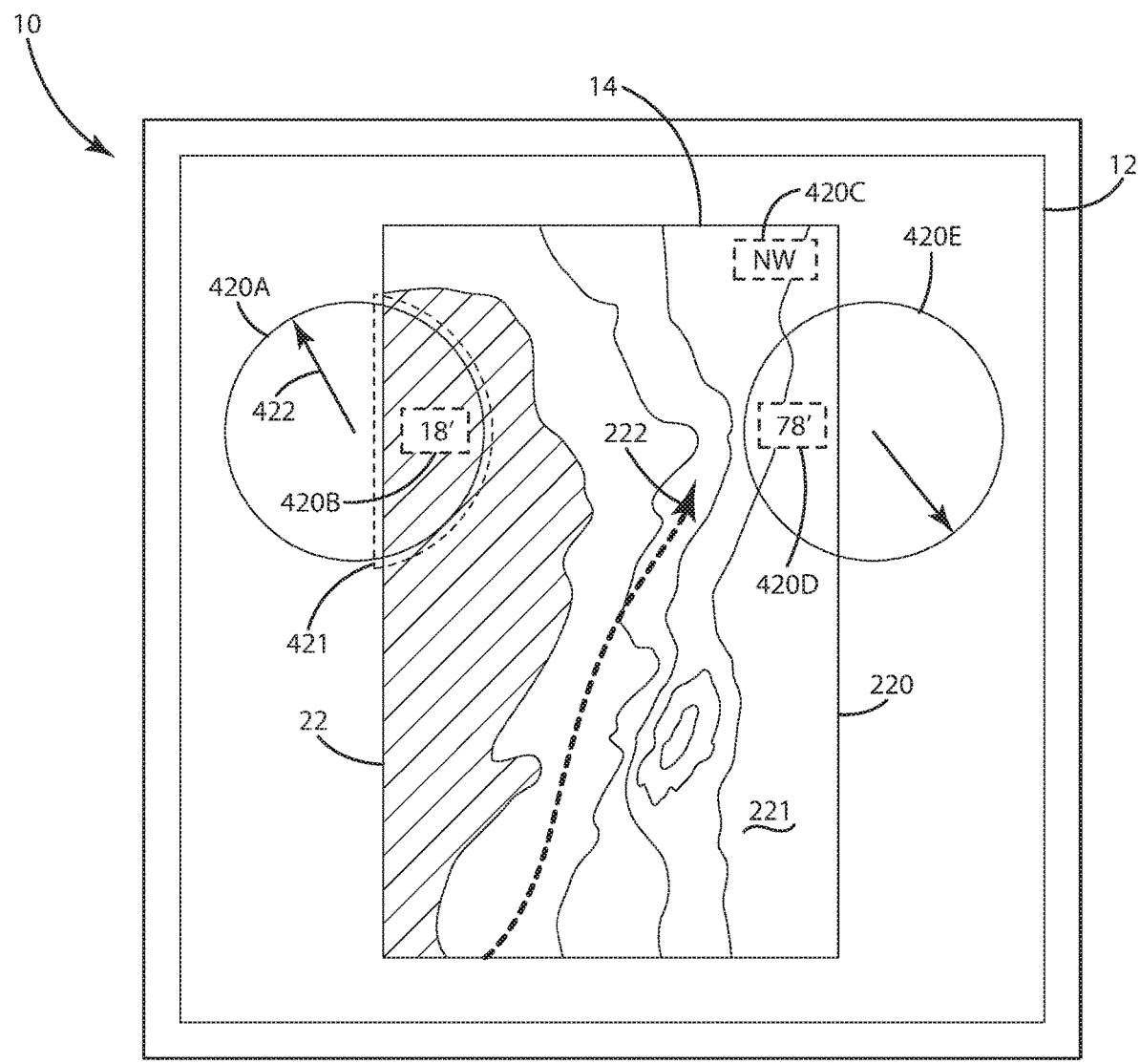
FIG. 6 is a representative view of the display according to one embodiment.

In the illustrated embodiment of FIG. 6, the display 10 is shown with the foreground layer 12 and the background layer 14 being based on graphical outputs from the interface application 400 and the guest system 300. Both the interface application 400 and the guest system 300 are generating graphical objects for presentation on the display 10. The interface application 400 in the illustrated embodiment is generating one or more interface graphical objects 420A-D for display on the foreground layer 12, and the guest system 300 is generating one or more guest graphical objects 220 on the background layer 14. The opacity of the one or more interface graphical objects 420A-D, or one or more portions thereof, may be varied selectively.

The opacity of the graphical objects 420A-D, or one or more portions thereof, may be varied in response to one or more events. At least one of the graphical objects 420A-D may be representative of information based on an input to the control system 30, such as an input from a water depth sensor. For instance, the graphical object 420B in the illustrated embodiment is indicative of real-time data measured from a water depth sensor indicating the depth is 18' at the current location. The graphical object 420A indicates similar information in a different manner using a digital representation of a dial gauge. The graphical object 420D in the illustrated embodiment is indicative of real-time data obtained from a temperature sensor indicating water temperature is 78 DegF. The graphical object 420E indicates similar temperature information in a different manner with a digital representation of a dial gauge. The graphical object 420C in the illustrated embodiment is indicative of real-time data obtained from a compass, indicating the current heading is North West, NW.

In the illustrated embodiment, all or portions of the graphical objects 420A-D are disposed in or overlap with the transparency area 22 of the foreground layer 12 through which graphical output from the guest system 300 can be displayed. For example, the graphical objects 420B, 420C, 420D are disposed in the transparency area 22 but may not completely obstruct the background layer 14. In this way, it should be noted that the entirety of the transparency area 22 need not have the same level of transparency—indeed, one or more portions (e.g., groups of pixels) of the transparency area 22 may be opaque whereas another portion of the transparency area 22 may be fully or partially transparent (e.g., depending on the alpha channel setting).

To provide another example, in the illustrated embodiment, a part of the graphical objects 420A, 420E overlaps with the transparency area 22 to define an overlapping portion 421. All or part of the overlapping portion 421 may be selectively varied in transparency based on one or more events. It should be noted that the transparency level of the overlapping portion 421, or a part thereof, may be varied separately from the all or part of the graphical objects 420A, 420E not included in the overlapping portion 421. For instance, the transparency level of the entire graphical object 420A may be increased or decreased. As another example, if the dial indicator 422 were disposed partially in the overlapping portion 421, the opacity of the entire dial indicator 422 may be increased while the opacity remains the same for other portions of the graphical object 420A (optionally disposed in and out of the overlapping portion 421).

In yet another example, a part of the graphical object 420A-E that is disposed in or overlaps with the transparency area 22 may be varied in opacity relative to another part of the graphical object 420A-E that is disposed in or overlaps with the transparency area 22.

As discussed above, the transparency level of the graphical object 420A-E, or a part thereof, may be selectively varied based on one or more events. As an example, the opacity of the graphical object 420B may increase to 100% in response to a sensed water depth being below a threshold. In this way, one type of event that may result in a change in transparency level is a sensed parameter or input to the control system 30 being above and/or below a threshold. It should be understood that alternative or additional events are within the scope of this disclosure, including any one or more input parameters satisfying one or more criteria.

For purposes of discussion, a visual characteristic of the graphical object 420A-E, or a part thereof, is described as being a transparency level that can be varied based on one or more criteria. Alternatively or additionally, one or more other visual characteristics of the graphical object 420 (e.g., a visual characteristic of all or a portion of the graphical object 420A-E) may be selectively varied based on one or more criteria. As an example, all or a portion of the graphical object 420A-E may blink, change color, or change to bold, or a combination thereof. In another example, in addition to increasing the opacity of the graphical object 420B in response to a depth being sensed below a threshold, the graphical object 420 may blink, change color, become bold, or a combination thereof.

In the illustrated embodiment of FIG. 6, the display 10 is depicted with the guest graphical object 220 generated from the guest application 310 of the guest system 300. The guest graphical object 220 in this embodiment includes a plurality of graphical elements 221, 222—but only one graphical element 221 may be presented in an alternative embodiment.

The guest graphical object 220 may display information that is predetermined. The predetermined information may be determined separate from the control system 30 and communicated to the control system 30. For instance, the predetermined information may be determined based on one or more measurements obtained and stored by a separate system. The one or more measurements or information based on these one or more measurements, or both, may be provided to the control system 30. In one embodiment, the predetermined information includes map information indicative of a maritime area and adjacent coast regions. The map information may include water depth information (e.g., depth numbers and contour lines) based on measurements determined prior being provided to the control system 30.

Additionally, or alternatively, the guest graphical object 220 may display information that is based on information determined substantially in real-time. For instance, the real-time information may be determined by control system 30 based on input from the one or more components as described herein, such as GPS coordinates relating to a position. In the illustrated embodiment of FIG. 6, the graphical element 221 provides map information based on predetermined information obtained by the control system 30, and the graphical element 222 is indicative of a position of the vehicle relative to the map and based on the GPS coordinates that are determined substantially in real-time. In this way, the guest graphical object 220 or the graphical objects 420, or both, may be based on information that is determined in real-time and information that is predetermined.

In the illustrated embodiment of FIG. 6, the graphical object 420A-E and the guest graphical object 220 may separately display first and second information having the same type but with the first information being determined in real-time and the second information being predetermined. In this way, the real time information may corroborate and enhance accuracy with respect to predetermined information being displayed. As an example, the graphical objects 420A-E in the illustrated embodiment are indicative of real-time information obtained from the control system 30, including for example water depth information determined substantially in real-time, temperature information determined substantially in real-time, and heading information determined substantially in real-time. The guest graphical object 220 in the illustrated embodiment is indicative of both real-time information and predetermined information, including for example location information determined substantially in real-time information and map information (with water depth) that is predetermined. Both the graphical objects 420A-B and the guest graphical object 220 include water depth information; however, the water depth information in the graphical objects 420A-B may be based on real-time measurements and the water depth information in the guest graphical object 220 may be based on predetermined information.

In one embodiment, as discussed herein, a visual characteristic of the graphical object 420A-B, or a part thereof, may vary based on one or more criteria, such as an event. The visual characteristic may be a transparency level, a blink rate, a color, or a bold setting. The one or more criteria for varying the visual characteristic may be based on real-time information of the same type as predetermined information presented in the guest graphical object 220. For instance, in the case of water depth information presented in both the graphical objects 420 and the guest graphical object 220, if real-time water depth information falls below a threshold, a visual characteristic of the guest graphical object 220 may be varied to highlight the predetermined information and/or call attention to the real-time water depth information being below the threshold. Water depth information is identified in this example for purposes of disclosure, but the example is not so limited and may be implemented in conjunction with any type of information, such as temperature information.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. An interface panel for a vehicle, the interface panel comprising:
   a display configured to provide graphic information to a vehicle operator;
   a graphics controller configured to direct the graphic information to the display based on graphical input representative of the graphic information; and
   an interface control system operably coupled to the graphics controller, the interface control system configured to provide the graphical input to the graphics controller to generate the graphic information on the display,
   wherein the interface control system includes a native operating system supporting an instrument application that generates instrument graphical output fed by the native operating system to the graphics controller, the instrument graphical output being representative of instrument graphic information, wherein the graphic information provided on the display to the vehicle operator includes the instrument graphic information,
   wherein the interface control system is configured to support a guest system that generates guest graphical output fed to the graphics controller, the guest graphical output being representative of guest graphic information, wherein the graphic information provided on the display to the vehicle operator includes the guest graphic information, wherein the guest system corresponds to a mobile device platform for a mobile device,
   wherein the interface control system is configured to mix the instrument graphic information with the guest graphic information to provide mixed graphical information to the display.

2. The interface panel of claim 1 wherein the mobile device platform corresponding to the guest system is configured to interface with an application store that supports download of mobile applications to the mobile device platform.

3. The interface panel of claim 1 wherein the guest system is a guest operating system.

4. The interface panel of claim 1 wherein the guest system includes a run-time environment in which the mobile device platform executes, wherein the run-time environment executes on the native operating system and supports execution of one or more mobile applications.

5. The interface panel of claim 4 wherein the guest system includes an Android® mobile operating system that executes in the run-time environment on the native operating system, wherein the Android® mobile operating system supports execution of the one or more mobile applications.

6. The interface panel of claim 1 wherein the native operating system includes a virtual execution environment supporting execution of the guest system.

7. The interface panel of claim 1 wherein a display area of the guest system on the display is variable in location and size during at least one of startup and operation, and wherein a transparency area associated with the display area is variable in location and size during at least one of startup and operation.

8. The interface panel of claim 7 wherein the transparency area is variable in location and size independent of a foreground layer used by the interface control system.

9. The interface panel of claim 1 wherein the interface control system directs the graphics controller to display the instrument graphic information in a foreground layer of the display with a transparency area through which a background layer of the display is visible; wherein the interface control system directs the guest graphic information to the background layer at a location corresponding to the transparency area of the foreground layer.

10. The interface panel of claim 9 comprising a touch screen interface operably coupled to the display and configured to provide touch-based feedback to the interface control system, wherein the interface control system is configured to provide the touch-based feedback to at least one of the instrument application and the guest system.

11. The interface panel of claim 10 comprising a touch feedback translator configured to translate a coordinate system of the display to a guest coordinate system of the guest system, wherein the touch feedback translator is configured to determine the guest coordinate system based on a scale and an offset with respect to a display area of the guest system on the display.

12. The interface panel of claim 10 wherein the touch-based feedback that corresponds to the transparency area is provided to the guest system.

13. The interface panel of claim 10 wherein the touch-based feedback is provided to both the instrument application and the guest system, and wherein the interface panel initiates an action based on information generated from both the instrument application and the guest system in response to the touch-based feedback.

14. The interface panel of claim 13 wherein the touch-based feedback is a touch gesture.

15. The interface panel of claim 1 wherein information is communicated at least one of: from the native operating system to the guest system and from the guest system to the native operating system, and wherein at least one of the native operating system and the guest system is configured to perform an action in response to receipt of information from the other of the native operating system and the guest system.

16. The interface panel of claim 1 wherein the instrument graphic information pertains to a status of the vehicle.

17. The interface panel of claim 16 wherein the instrument graphic information provides at least one of a speedometer instrument, a tachometer instrument, a fuel gauge and an engine status, and HVAC status, generator status, and heated seat status.

18. An interface panel for a vehicle, the interface panel comprising:
a display configured to provide graphic information to a vehicle operator;
a graphics controller configured to direct the graphic information to the display based on graphical input representative of the graphic information; and
an interface control system operably coupled to the graphics controller, the interface control system configured to provide the graphical input to the graphics controller to generate the graphic information on the display,
wherein the interface control system includes a native operating system supporting an instrument application that generates instrument graphical output fed by the native operating system to the graphics controller, the instrument graphical output being representative of instrument graphic information, wherein the graphic information provided on the display to the vehicle operator includes the instrument graphic information,
wherein the interface control system is configured to support a guest system that generates guest graphical output fed to the graphics controller, the guest graphical output being representative of guest graphic information, wherein the graphic information provided on the display to the vehicle operator includes the guest graphic information, wherein the guest system corresponds to a mobile device platform for a mobile device,
wherein the native operating system incorporates the guest graphic information into the instrument graphic information such that the instrument graphical output fed to the graphics controller enables display of both the instrument graphic information and the guest graphic information on the display.

19. A method of displaying information on a vehicle interface, the method comprising:
generating, in an interface application, interface graphical information for display to a vehicle operator;
running a mobile application platform separate from the interface application;
generating, from the mobile application platform, mobile application graphical information for display to the vehicle operator;
mixing the interface graphical information with the mobile application graphical information to generate mixed graphical information; and
displaying the mixed graphical information to the vehicle operator.

20. The method of claim 19 comprising communicating information at least one of from the interface application to the mobile application platform and from the mobile application platform to the interface application; and
performing an action in at least one of the interface application and the mobile application platform in response to receipt of information from the other of the interface application and the mobile application platform.

21. The method of claim 19 wherein the mobile application platform corresponds to an Android® mobile operating system.

22. The method of claim 19 wherein said running the mobile application platform includes running a virtual execution environment supporting execution of the mobile application platform.

23. The method of claim 19 wherein said generating interface graphical information includes generating a visual representation of at least one of a speedometer instrument, a tachometer instrument, a fuel gauge, an engine status indicator, HVAC status, generator status, and heated seat status.

24. A method of displaying information on a vehicle interface, the method comprising:
generating, in an interface application, interface graphical information for display to a vehicle operator;
running a mobile application platform separate from the interface application;
generating, from the mobile application platform, mobile application graphical information for display to the vehicle operator;

providing the interface graphical information to a foreground layer of an interface display;
generating a transparency area in the foreground layer such that a background layer of the interface display is visible through the foreground layer; and
providing the mobile application graphical information to the background layer of the interface display.

25. The method of claim 24 comprising varying a location and a size of a display area of the mobile application platform during at least one of startup and operation, and varying a location and a size of the transparency area during at least one of startup and operation.

26. The method of claim 24 comprising:
receiving touch-based feedback from a user touching the interface display;
in response to receiving the touch-based feedback outside the transparency area, directing the touch-based feedback to the interface application; and
in response to receiving the touch-based feedback inside the transparency area, directing the touch-based feedback to the mobile application platform.

27. The method of claim 26 comprising translating the touch-based feedback from a coordinate system associated with the interface display to a guest coordinate system of the mobile application platform, wherein said translating includes determining the guest coordinate system based on a scale and an offset with respect to a display area of the mobile application platform on the interface display.

28. The method of claim 26 comprising in response to receiving touch-based feedback, regardless of whether the touch-based feedback is inside or outside the transparency area, directing the touch-based feedback to the interface application and the mobile application platform.

29. The method of claim 28 comprising initiating an action based on information generated from both the interface application and the mobile application platform in response to the touch-based feedback.

30. The method of claim 24 comprising communicating information at least one of from the interface application to the mobile application platform and from the mobile application platform to the interface application; and
performing an action in at least one of the interface application and the mobile application platform in response to receipt of information from the other of the interface application and the mobile application platform.

31. The method of claim 24 wherein the mobile application platform corresponds to an Android® mobile operating system.

32. The method of claim 24 wherein said running the mobile application platform includes running a virtual execution environment supporting execution of the mobile application platform.

33. The method of claim 24 wherein said generating interface graphical information includes generating a visual representation of at least one of a speedometer instrument, a tachometer instrument, a fuel gauge, an engine status indicator, HVAC status, generator status, and heated seat status.

34. A user interface for a vehicle comprising:
a display configured to provide graphic information to a vehicle operator;
a touch screen interface operably coupled to the display, the touch screen interface configured to generate touch-based feedback corresponding to a location of the display that is touched by a user;
a graphics controller configured to direct the graphic information to the display based on graphical input representative of the graphic information; and
a one or more processors configured to support directing graphic information to the graphics controller from an interface system and a guest system, the interface system configured to generate graphical information pertaining to a status of the vehicle, the guest system corresponding to a mobile application platform, wherein the mobile application platform is configured to entirely utilize a display resource,
wherein graphic information generated from the interface system is provided to an interface area of the display,
wherein graphic information generated from the guest system is provided to a guest system area of the display,
wherein touch-based feedback corresponding to a guest system area is directed to the guest system, wherein touch-based feedback corresponding to the interface area is directed to the interface system,
wherein the interface area of the display is visible on a foreground layer of the display, wherein the foreground layer includes a transparency layer through which a background layer is visible, wherein the guest system area of the display is visible on the background layer through the transparency layer.

35. The user interface of claim 34 wherein the mobile application platform is an Android® application platform, and wherein the user interface is incorporated into a graphical gauge for the vehicle.

36. The user interface of claim 34 wherein a native operating system supports the interface system, and wherein the guest system is supported one of natively by the native operating system or within a virtual execution environment of the native operating system.

* * * * *